United States Patent [19]

Ambasz

[11] Patent Number: 4,917,392
[45] Date of Patent: Apr. 17, 1990

[54] COLLAPSIBLE LUGGAGE CARRIER

[76] Inventor: Emilio Ambasz, 295 Central Park West, New York, N.Y. 10024

[21] Appl. No.: 355,552

[22] Filed: May 22, 1989

[51] Int. Cl.[4] .............................................. B62B 3/04
[52] U.S. Cl. .................................... 280/40; 280/655; 280/47.29
[58] Field of Search ................... 280/38, 40, 646, 654, 280/655, 47.29, 651, 652

[56] References Cited

U.S. PATENT DOCUMENTS

| | | | |
|---|---|---|---|
| 2,837,346 | 6/1958 | Chambless | 280/37 |
| 3,043,603 | 7/1962 | Major, Sr. | 280/47.29 X |
| 3,241,852 | 3/1966 | Muller et al. | 280/40 |
| 3,960,252 | 6/1976 | Cassimally | 190/18 A |
| 4,087,102 | 5/1978 | Sprague | 280/40 X |
| 4,315,632 | 2/1982 | Taylor | 280/40 |
| 4,335,895 | 6/1982 | Walker | 280/40 X |
| 4,448,434 | 5/1984 | Anderson | 280/40 |
| 4,506,897 | 3/1985 | Libit | 280/40 |
| 4,588,055 | 5/1986 | Chen | 190/18 A |
| 4,754,985 | 7/1988 | Im et al. | 280/47.29 X |

Primary Examiner—Charles A. Marmor
Assistant Examiner—Michael Mar
Attorney, Agent, or Firm—Brumbaugh, Graves, Donohue & Raymond

[57] ABSTRACT

A collapsible luggage carrier comprises a handle having portions adjacent its lower end adapted to provide support for an article in a first plane and a base joined to the handle for articulation between an extended position in which portions of the base provide support for an article in a second plane disposed substantially orthogonally to the first plane and a collapsed position in which the second plane substantially coincides with the first plane. Transversely spaced-apart wheeled carriages received on the lower end of the handle portion pivot between positions in which they are extended to orient the axes of rotation of the wheels in parallel relation to the first plane and positions in which they are retracted to orient the axes of rotation of the wheels orthogonally to the first plane. A cam arrangement moves the wheeled carriages between the extended and retracted positions automatically in response to movements of the base between its extended and collapsed positions.

9 Claims, 4 Drawing Sheets

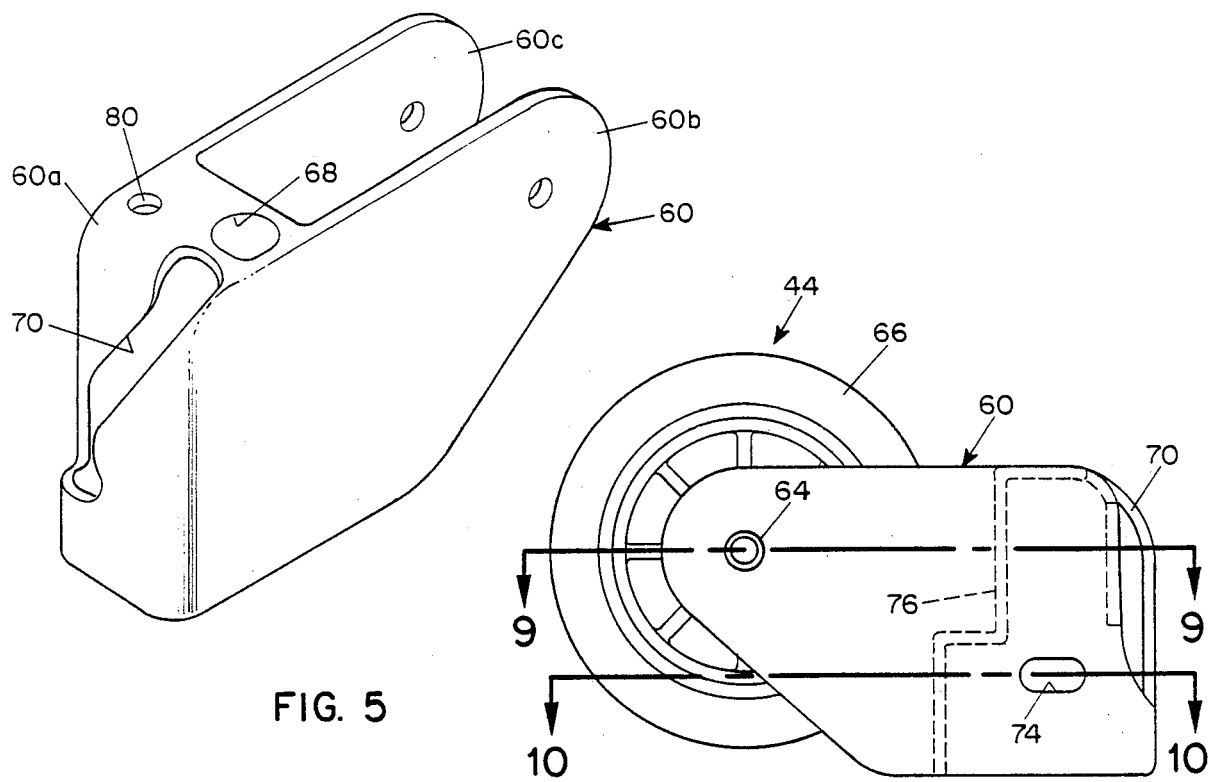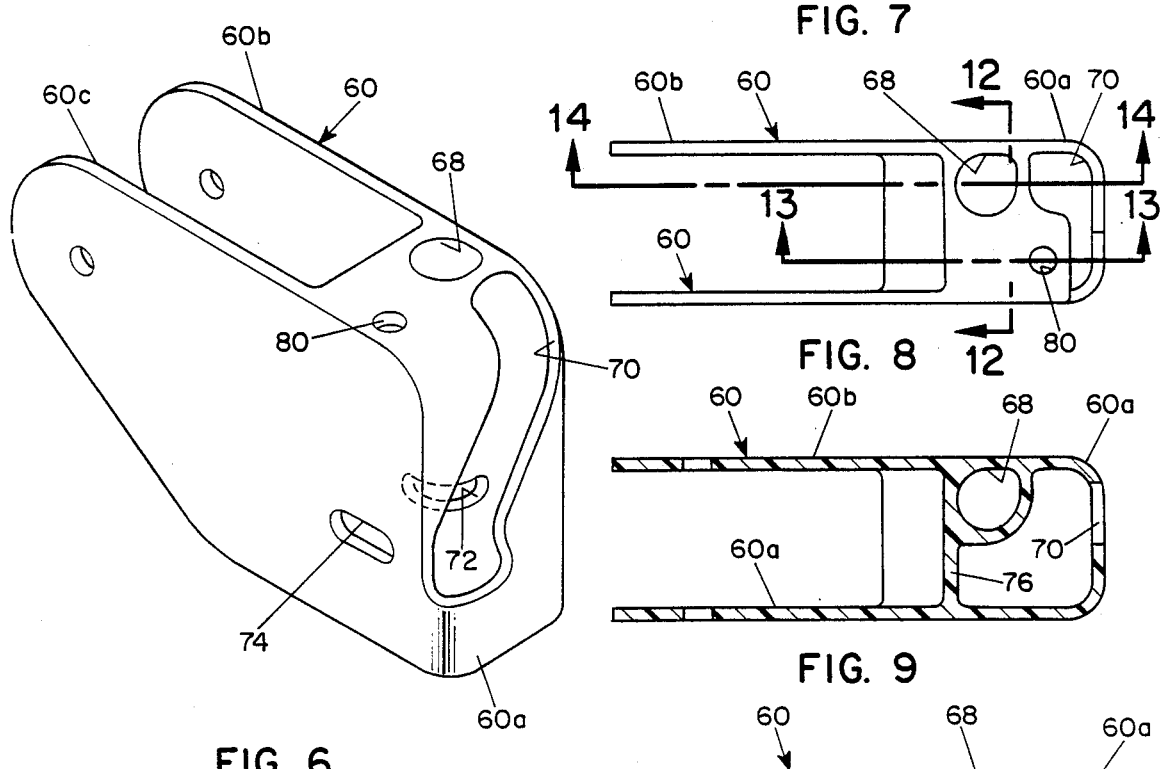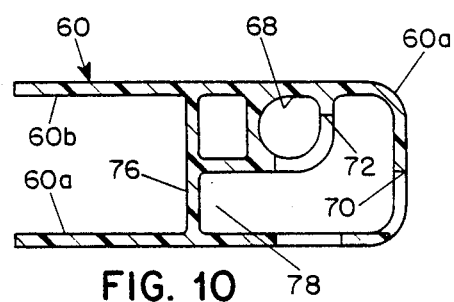

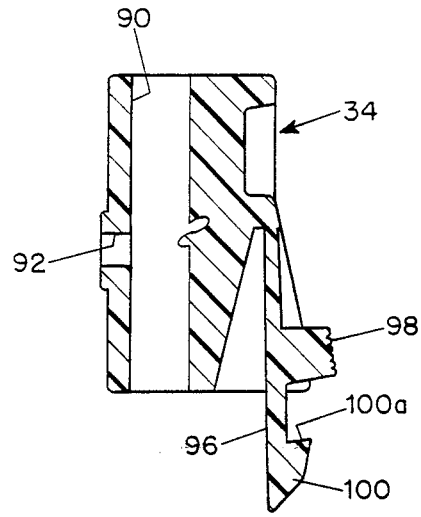
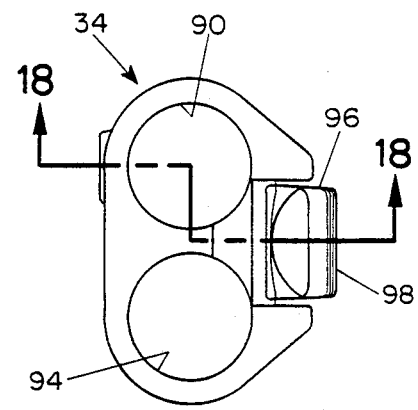
FIG. 18      FIG. 19
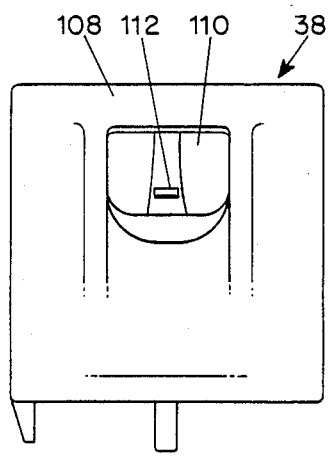
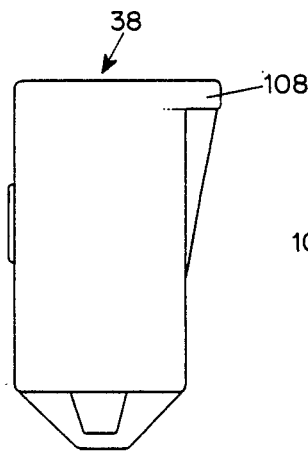
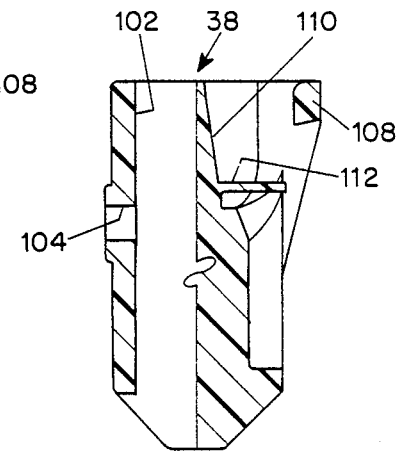
FIG. 20      FIG. 21      FIG. 22
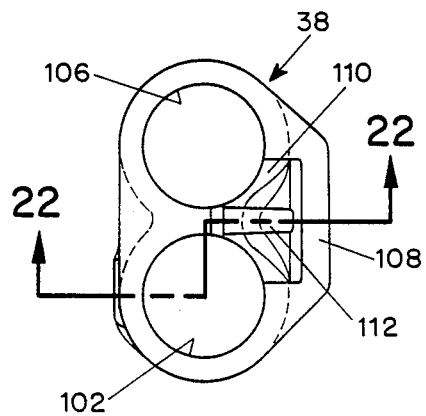
FIG. 23

COLLAPSIBLE LUGGAGE CARRIER

BACKGROUND OF THE INVENTION

Many travellers use portable carriers to carry their luggage. The most common type of luggage carrier is made primarily of metal rod stock bent and welded to provide a handle component, which is often in two foldable parts, and a foldable base on which the luggage rests. Usually, small wheels are attached to a fixed axle at the bottom end of the handle component. This type of luggage carrier is usually small in size and of light weight, which makes it easy to carry when it is not in use. On the other hand its small size and somewhat flimsy construction make it somewhat fragile and prone to tipping over. The small wheels can get caught against breaks in floors, such as door thresholds and lead-ins to mats, carpets, and escalators, and the many irregularities encountered in sidewalks and streets. It is often necessary to lift the luggage carrier free from even small obstructions to rolling of the wheels, which partially defeats the main purpose of such carriers, which is to make it unnecessary to lift and carry heavy and bulky luggage or other articles. Many of these luggage carriers are also difficult to collapse for storage and transport and to deploy for use.

SUMMARY OF THE INVENTION

One object of the present invention is to provide a collapsible luggage carrier that is relatively light in weight and when collapsed is compact and of small size so that it can be easily and conveniently transported and stored when not in use while at the same time is strong and stable and, therefore, is able to handle heavy and large loads without being damaged and with ease and assurance. Another object is to make it possible to use relatively large-size wheels for easier rolling on all surfaces and especially for passage over common irregularities such as the floor breaks mentioned above and joints, low curbs, grates and the like encountered on sidewalks and streets. It is a further object of the invention to provide a luggage carrier that is easy to collapse for transport and storage and to extend for use. Still another object is to provide a collapsible luggage carrier with the aforementioned attributes and advantages that can be mass-produced at relatively low cost.

The foregoing and other objects and advantages are attained, according to the present invention, by a collapsible luggage carrier comprising a handle having portions adjacent its lower end adapted to provide support for an article in a first plane and a base joined to the handle for articulation between an extended position in which portions of the base provide support for an article in a second plane disposed substantially orthogonally to the first plane and a collapsed position in which said second plane substantially coincides with the first plane. A pair of transversely spaced-apart wheeled carriages are mounted on the lower end of the handle portion for pivotal movement between extended positions in which the axes of rotation of the wheels are oriented in parallel relation to the first plane and collapsed positions in which they are retracted with their axes of rotation oriented orthogonally to the first plane. A cam arrangement moves the wheeled carriages between the extended and retracted positions automatically in response to movements of the base between its extended and collapsed positions.

Preferred embodiments of the invention may have the following additional characteristics, either alone or in combination:

(1) the cam arrangement includes a cam slot on each wheeled carriage and a leg member of the base received in the cam slot;

(2) the handle includes spaced-apart parallel shaft portions at its lower end disposed substantially in the first plane and each carriage includes a socket portion pivotably received on a corresponding shaft portion of the handle;

(3) each leg member of the base is coupled to a corresponding shaft portion of the handle for articulation by a pivot pin, and the socket portion has a slot through which the pivot pin extends, the slot enabling pivoting of the carriage about the corresponding shaft portion;

(4) each wheeled carriage is generally U-shaped in plan and includes a base portion in which the socket and the cam slot are located and a pair of leg portions extending from the base portion and supporting an axle and straddling a wheel mounted on the axle;

(5) the handle includes a first U-shaped member having a base portion and a pair of leg portions extending from the base portion, the distal extremities of the legs constituting said shaft portions on which the respective carriages are rotatably mounted;

(6) the handle includes a second U-shaped member having a base portion and a pair of leg portions extending from the base portion, and the leg portions of the second handle member are coupled to the leg portions of the first handle member for movement of the second handle member between a collapsed position in which it substantially overlaps the first handle member and an extended position in which the respective base portions of the handle member are spaced-apart and the leg portions only partly overlap; and (7) the coupling arrangement between the two handle members includes a releasable latch for retaining the handle in the extended position.

For a better understanding of the invention, reference may be made to the following description of an exemplary embodiment, taken in conjunction with the following drawings.

DESCRIPTION OF THE DRAWINGS

FIG. 5 is a three-quarter front pictorial view of a wheel bracket for the right wheel of the carrier, the view showing the inside aspect;

FIG. 6 is a three-quarter front pictorial view of the right wheel bracket and shows the outside aspect;

FIG. 7 is a detail elevational view of the outside aspect of the right wheeled carriage;

FIG. 8 is a top plan view of the right wheel bracket;

FIGS. 9 and 10 are side cross-sectional views of the right wheel bracket taken along the planes indicated by the correspondingly numbered arrowed lines in FIG. 7;

FIG. 18 is a rear cross-sectional view of the upper coupling member taken along a broken plane indicated by the lines 18—18 in FIG. 19;

FIG. 19 is a top plan view of the upper coupling member;

FIGS. 20 and 21 are inside and rear elevational views, respectively, of the left side lower coupling member of the handle;

FIG. 22 is a rear cross-sectional view of the lower coupling member taken generally along a broken plane, as indicated by the lines 22—22 in FIG. 23; and FIG. 23 is a top plan view of the lower coupling member.

DESCRIPTION OF THE EMBODIMENT

Figure 1:
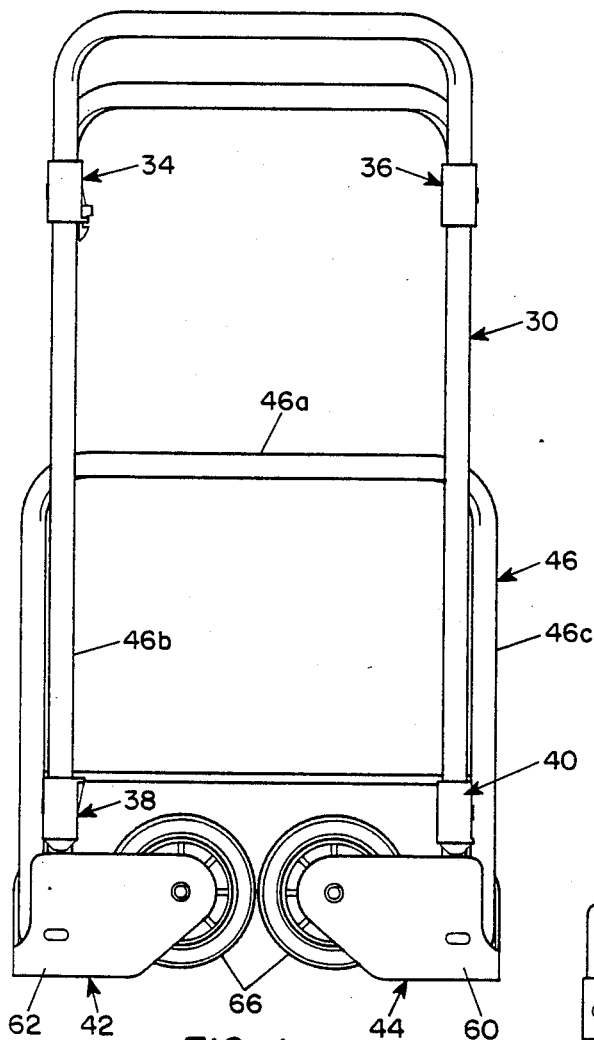
FIG. 1 is a rear elevational view of the embodiment in its fully collapsed condition.
Figure 2:
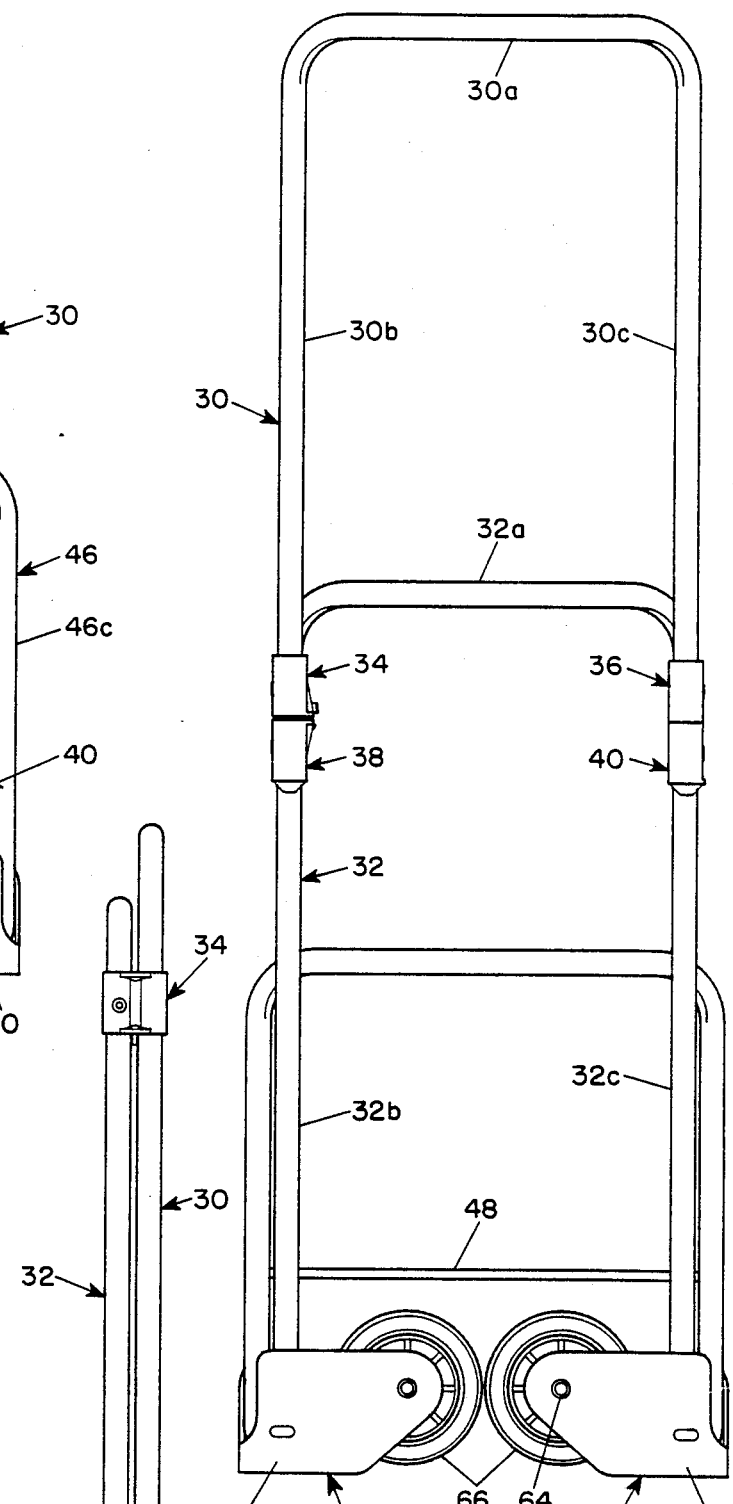
FIG. 2 is a rear elevational view showing the handle extended but the wheeled carriages and base folded.
Figure 3:
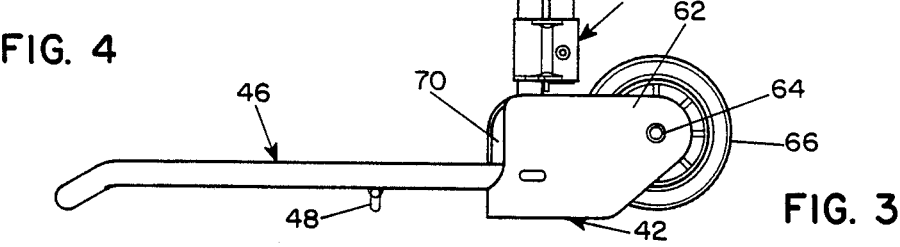
FIG. 3 is a side-elevational view showing the base and wheeled carriages extended.
Figure 11:
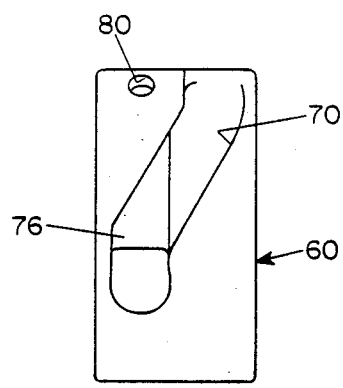
FIG. 11 is a front elevational view of the right wheel bracket.
Figure 13:
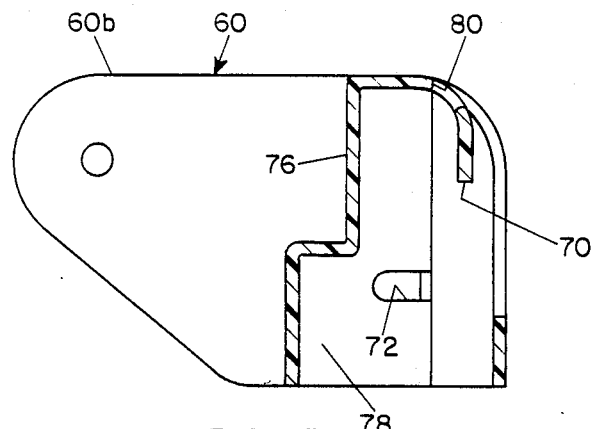
FIGS. 12 to 14 are cross-sectional views taken along the correspondingly numbered lines in FIG. 8.
Figure 12:
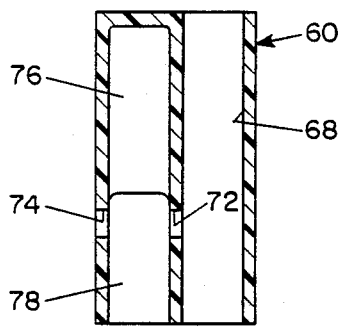
Figure 14:
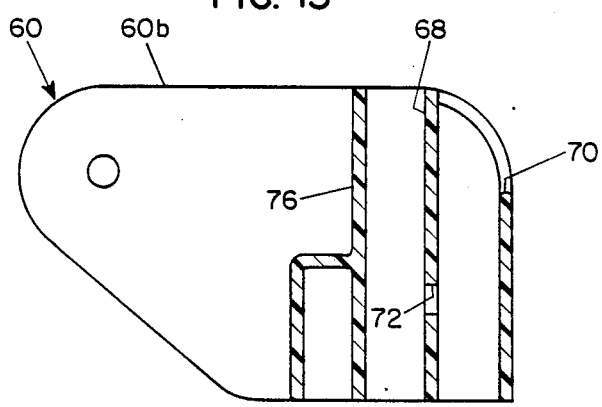
Figure 15:
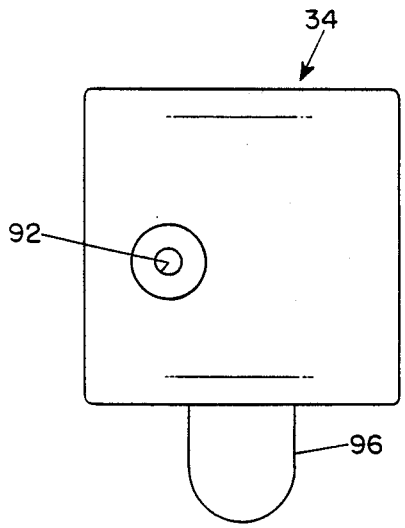
FIGS. 15 to 17 are outside, inside and rear elevational views, respectively, of the left side upper coupling member of the handle.
Figure 16:
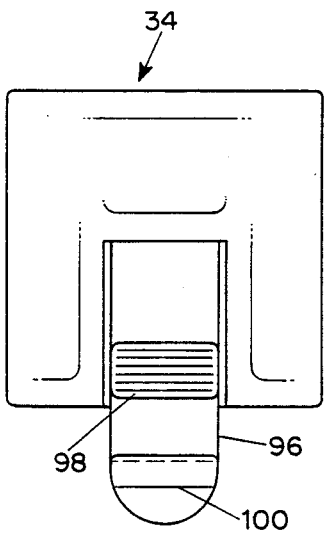
Figure 17:
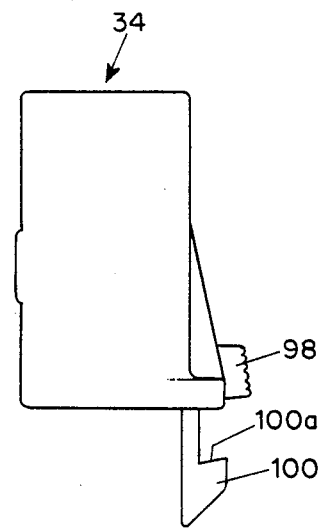

Referring first to FIGS. 1 to 3, the embodiment comprises a handle assembly composed of an upper handle member 30 and a lower handle member 32 joined by left and right side upper connectors 34 and 36 and lower connectors 38 and 40 that enable the members to be moved between a collapsed configuration (FIGS. 1 and 3) and an extended configuration (FIG. 2). Left and right wheeled carriages 42 and 44 are pivotably mounted on the lower extremities of the lower handle member legs in a manner such that they automatically pivot to folded-in positions (FIGS. 1 and 2) and rearwardly extended positions (FIG. 3) when a base member 46 is moved between a folded-up position (FIGS. 1 and 2) and an extended position (FIG. 3).

The handle members 30 and 32 and the base member 46 are preferably made of lengths of aluminum tube stock bent into "U"-shapes—tubes are easy to form and are strong, lightweight, and stiff.

Figure 4:
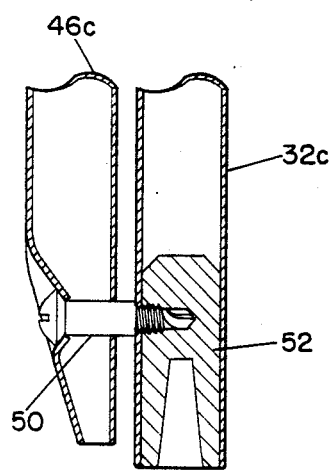
FIG. 4 is a detail in cross section of the pivot connection between a leg of the base and the end of a handle leg.

The portions of each of the members 30, 32 and 46 will be referred to as base portions "a" and left and right leg portions "b" and "c", together with their reference numerals. The spacing between the leg portions 30b and 30c is equal to the spacing between the leg portions 32b and 32c, and the members 30 and 32, therefore, nearly fully overlap, front to back, in the collapsed condition and partially overlap in the collapsed condition. The spacing between the leg portions 46b and 46c of the base member is such that they lie wholly outside of the leg portions 32b, 32c. As more clearly appears below, the plane of the leg portions 46b and 46c coincides with the plane of the leg portions 32b and 32c when the base 46 is folded up. Accordingly, the junctures of the base portion 46a with the leg portions 46b and 46c are bent to provide a forward offset of the base portion 46a (See FIG. 4) so that the base portion 46a can be in front of the leg portions 32b, 32c when the base member is folded up. A cross-piece 48 bridges the space between the leg portions 46b, 46c and enhances the lateral stiffness of the lower part of the carrier.

The free end of each base member leg portion 46b, 46c is fastened by a pivot pin 50 (FIG. 4)—for example, a self-drilling, self-tapping screw is used—to the corresponding free end of the handle member leg portions 32b, 32c so that the base can pivot between the folded-up and extended positions. The ends of the leg portions 46b, 46c are crimped and drilled or die cut to provide a hole for the shank of the pin. A plug 52 is press-fit into each leg portion 32b, 32c to provide a strong anchor point for the screw threads. The screw shank provides a stand-off space between the respective leg portions for the reason that is revealed in the next two paragraphs.

FIGS. 5 to 14 show the wheel bracket 60 of the right wheeled carriage 44. The left bracket 62 (e.g., FIG. 1) is of the same design as the right bracket, except that it is the mirror image with respect to the top and bottom plan aspects; accordingly, the following description of the right bracket and the views of FIGS. 5 to 14 are applicable to the left side carriage 42, except for right to left reversal. The wheel brackets are preferably molded in one piece from a high impact strength polymer, such as nylon or polypropylene [?]. The bracket 60 is generally U-shaped in plan (FIGS. 8 to 10). Its leg portions 60b and 60c receive an axle 64 that carries a relatively large diameter wheel 66. The base portion 60a has a vertical socket 68 that receives the free, lower end of the handle leg portion 32b with sliding clearance so that the wheel bracket can rotate about the axis of the leg portion 32b; in this respect the lower end of the leg portion 32b serves as a pivot shaft for the wheeled carriage.

The front wall and the forward extremity of the top wall of the base portion 60a has a generally "S"-shaped cam slot 70 that receives the free end of the leg 46b of the base member. Recalling that the base member leg 46b is pivotably connected to the handle leg member 32b by a pin 50 (FIG. 4), the shank of the pin 50 passes through a slot 72 extending circumferentially along part of the outward and forward walls of the socket 68 (see FIGS. 6, 10 and 13) The slot 72 allows the pin 50 to make the articulating connection between the base 46 and handle 32 of the carrier while allowing the bracket 60 to rotate about the axis of the handle leg portion 32b through an arc of ninety degrees (90°). The standoff of the base leg portion 46b from the handle leg portion 32b (FIG. 4) is slightly greater than the thickness of the slotted wall of the socket 68. A hole 74 in the outer side of the wheel bracket provides access for installing the pin 50; after assembling the bracket 60 onto the handle leg portion 32b, the base leg portion 46b is inserted in the extended position (FIG. 3) through the lower end of the cam slot 70, and the pin 74 is installed through the access hole 74. The transverse wall portion 76 of the bracket 60 has an offset to the rear in its lower portion, which provides a clearance space 78 for the end part of the leg portion 46b (between the terminus and the pin 50) when the base member 46 is extended (see FIGS. 10 and 13).

When the base member is pivoted about the pivot pin 50 to the folded-up position (FIGS. 1 and 2), its leg portion 46b lies laterally outside of and in the plane of the handle leg portion 32b and resides in a vertical position such that it passes through the upper end of the cam slot 70 of the bracket 60. In that position it holds the bracket flatwise substantially in the plane of the base member 46 and lower handle member 32 (FIGS. 1 and 2). When the user folds down the base member, the leg portion 46b works against the cam slot 70 as it moves downwardly through the slot and pivots the bracket rearwardly and outwardly (counterclockwise with respect to FIGS. 8 to 10) about the handle leg portion 32b until the bracket 60 attains a position oblique to the plane of the handle such that the rotation axes of the wheels 66 are parallel to the plane of the handle (FIG. 3), which position is attained when the leg portion 46b reaches the lower end of the cam slot.

In the extended and vertically upright position of the carrier (FIG. 3) the lower edges of the brackets 60 and 62 rest on the floor (or other surface) while the wheels 66 reside slightly above the floor. Conveniently, and by design, the base portion 46a of the base members provides a forward support point for the carrier, which is, therefore, stable when free-standing upright for loading and for standing at rest. Articles to be carried are loaded onto the base, and the conventional shock card can be provided to secure the articles firmly against the front of the handle. A hole 80 is provided in each wheel bracket 60, 62 for the ends of shock cards, which can be knotted or, better, anchored by crimped-on fittings on the underside of the top wall of the brackets. The shock cards are looped under and the up in front of the articles, and hooks (not shown) at their other ends hook onto the handle members 30 or 32 at any convenient points.

The upper coupling member 34 for the left side of the handle assembly is shown in FIGS. 15 to 19. All of the coupling members are, preferably, molded from a durable polymeric material, such as nylon or polypropylene [?]. The member 34 has a front socket 90 that is received with a close fit on the leg portion 32b of the lower handle member 32 at a location near the juncture with the base portion 32a. A screw or rivet (not shown) is passed through the hole 92 into the tube to secure the coupling member in place. A front socket 94 receives the leg portion 30b of the upper handle member 30 with a sliding fit. An integral resiliently deflectable latch lever 96 having a serrated finger-engagable boss portion 98 and a latch lug 100 depends from the inner face of the coupling member.

The left side lower latch coupling member 38 (FIGS. 20–23) has a rear socket 102 that receives and is fastened to the lower end of the upper handle leg portion 30b by a screw or rivet (not shown) passed through a hole 104 into the tube and a front socket 106 that slidably receives the lower handle leg portion 32b. A latch bar 108 extends across the inward edge of a latch-receiving opening 110. A resilient ejector finger 112 extends into the opening and is in a position to be engaged and deflected by the lower tip of the lug 100 when the upper handle member is extended (FIG. 2). When deformed it applies a force upwardly and inwardly on the latch lug 100 and assists in setting it and keeping it set with the shoulder 100a engaged with the latch bar 108. When the user depresses the latch lever 96, the finger 112 provides a bias that urges the upper handle member down far enough to prevent the latch from resetting when the finger boss 98 is released. It is apparent, of course, that when the upper handle member is raised from the collapsed state of FIG. 1 to the extended state of FIG. 2, the latch automatically catches—the inner bevelled faces on the lug 100 are worked against by a camming action of the latch bar 108 to depress resiliently the latch lever 96 so that the lug 100 clears the bar 108, whereupon the lever 96 resiles into the latched position with the assistance of the ejection finger 112.

The coupling members 36 and 40 on the right side of the handle assembly do not have a latch but are otherwise the same as the coupling members 34 and 38—i.e., they both have sockets for both leg portions 30c, 32c and are fastened to the respective leg portions 30c, 32c while slidably receiving the leg portions 30b, 32b. If desired, mirror image coupling members with latching elements like members 34 and 38 can be used on the right side. It is thought, however, that the luggage carrier is easier to use with only one handle latch.

A luggage carrier according to the embodiment can be produced at relatively low cost. The tube members are easy to fabricate with simple tools and the molded components are readily mass-produced. Assembly involves only installing the wheels 44 and axles 64 on the brackets, assembly of the handle with four screws or rivets and assembling the carriages, base member and handle, which involves only the two self-drilling, self-tapping pins 50.

The carrier is easy to use. Extending it for use requires only pulling up the upper handle 30, which automatically latches, and extending the base 46, which automatically deploys the wheeled carriages 42 and 44. The carrier stands stably for loading (FIG. 3).

In use the carrier is rocked back onto the wheels 66 and pulled (preferably, though it can be pushed) by gripping the base portion 30a—the relatively large diameter tube of the handle provides a comfortable and sure hand grip. The large wheels roll easily, even over uneven surfaces. The tubes are stiff and provide a feeling of security, as compared to flimsy rods that often allow the load to wobble and sway and leave a nagging fear that the carrier will break or the load will fall.

Collapsing the carrier requires only lifting up the base 46, which automatically folds the wheels flat (FIGS. 1 and 2) and leaves a compact, flat unit, releasing the latch, and pushing the upper handle down (FIG. 1).

I claim:

1. A collapsible luggage carrier comprising a handle having portions adjacent its lower end adapted to provide support for an article in a first plane; a base having a pair of leg members joined to the handle for pivotal movement between an extended position in which portions of the base provide support for an article in a second plane disposed substantially orthogonally to the first plane and a collapsed position in which said base is substantially parallel with the first plane; a pair of transversely spaced-apart wheeled carriages attached to the lower end of the handle portion for pivotal movement between an extended position in which the axes of rotation of the wheels are in parallel relation to the first plane and a collapsed position in which the wheeled carriages are retraced and the axes of rotation of the wheels are disposed orthogonally to the first plane, and cam means including an S-shaped cam slot located in each wheeled carriage through which a respective leg member of said base extends, said cam means moving the wheeled carriages between their extended and collapsed positions in response to movement of the base between its extended and collapsed positions respectively.

2. A collapsible luggage carrier according to claim 1 wherein the handle includes spaced-apart parallel shaft portions at its lower end disposed substantially in the first plane and each carriage includes a socket portion pivotably received by a corresponding shaft portion of the handle.

3. A collapsible luggage carrier according to claim 2 wherein each leg member of the base is coupled to a corresponding shaft portion of the handle for articulation by a pivot pin, and wherein the socket portion has a slot through which the pivot pin extends, the slot enabling pivoting of the carriage about the corresponding shaft portion.

4. A collapsible luggage carrier according to claim 3 wherein each carriage is generally U-shaped in plan and includes a base portion having the socket and the cam slot and a pair of leg portions extending from the base portion and supporting an axle and straddling a wheel mounted on the axle.

5. A collapsible luggage carrier according to claim 2 wherein the handle includes a first U-shaped member having a base portion and a pair of leg portions extending from the base portion, the extremities of the legs constituting said shaft portions for the respective carriages.

6. A collapsible luggage carrier according to claim 5 wherein the handle includes a second U-shaped member having a base portion and a pair of leg portions extending from the base portion, and a means coupling the leg portions of the second handle member to the leg portions of the first handle member for movement of the second handle member between a collapsed position in which it substantially overlaps the first handle member and an extended position in which the respective base portions of the handle member are spaced-apart and the leg portions only partly overlap.

7. A collapsible luggage carrier according to claim 6 wherein the coupling means includes releasible latch means for retaining the handle in the extended position.

8. A collapsible luggage carrier according to claim 6 wherein the coupling means includes a lower coupling member affixed to each of the leg portions of the second handle member adjacent its free end and having a sleeve portion slidably receiving a corresponding leg portion of the first handle member and an upper coupling member affixed to each of the leg portions of the first handle member proximate to the base portion and having a sleeve portion slidably receiving the corresponding leg portion of the second leg member.

9. A collapsible luggage carrier according to claim 8 wherein at least one of the corresponding upper and lower coupling members have, respectively, a releasable latch lug member and a co-acting latch bar member adapted to be releasably coupled to retain the handle in the extended position.

* * * * *